US011695490B2

(12) United States Patent
Dai et al.

(10) Patent No.: US 11,695,490 B2
(45) Date of Patent: Jul. 4, 2023

(54) ROBUST LINK SYNCHRONIZATION IN ETHERNET NETWORKS

(71) Applicant: Marvell Asia Pte, Ltd., Singapore (SG)

(72) Inventors: Shaoan Dai, San Jose, CA (US); Hon Wai Fung, Newark, CA (US); Xing Wu, Palo Alto, CA (US); Dance Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/485,319

(22) Filed: Sep. 24, 2021

(65) Prior Publication Data

US 2022/0103276 A1 Mar. 31, 2022

Related U.S. Application Data

(60) Provisional application No. 63/083,630, filed on Sep. 25, 2020.

(51) Int. Cl.
*H04J 3/06* (2006.01)
*H04L 7/10* (2006.01)
*H04L 12/40* (2006.01)

(52) U.S. Cl.
CPC .............. *H04J 3/0658* (2013.01); *H04L 7/10* (2013.01); *H04L 12/40013* (2013.01)

(58) Field of Classification Search
CPC ..... H04L 12/12; H04L 7/0004; H04L 69/323; H04L 7/043; H04L 7/10; H04L 12/40013; H04J 3/0658
See application file for complete search history.

(56) References Cited

U.S. PATENT DOCUMENTS

| 10,511,406 | B1 * | 12/2019 | Lo ......................... H04L 1/0007 |
| 2013/0080817 | A1 | 3/2013 | Mihelic |
| 2013/0243011 | A1 * | 9/2013 | Ungerboeck ......... H04L 12/403 370/464 |
| 2014/0029935 | A1 | 1/2014 | Regan et al. |
| 2015/0381777 | A1 * | 12/2015 | Dalmia ................. H04L 1/0006 370/475 |

(Continued)

OTHER PUBLICATIONS

Hatamian et al, "Design Considerations for Gigabit Ethernet 1000Base-T Twisted Pair Transceivers", IEEE 1998 (Year: 1998).*

(Continued)

*Primary Examiner* — Omer S Mian (57) ABSTRACT

A second device receives a first synchronization signal transmitted by a first device for training synchronization between the second device and the first device. The second device then transmits one or more initial synchronization response signals to the first device. The one or more initial synchronization response signals are from among a fixed number of synchronization response signals that the second device is configured to transmit to the first device. After transmission of the one or more initial synchronization response signals, the second device receives a second synchronization signal from the first device. After receiving the second synchronization signal, the second device continues transmission of synchronization response signals to the first device until the fixed number of synchronization response signals are transmitted from the second device to the first device.

20 Claims, 5 Drawing Sheets

(56) References Cited

U.S. PATENT DOCUMENTS

2020/0052877 A1* 2/2020 Tu .................. H04L 12/413

OTHER PUBLICATIONS

Cherubini etal, "1OOBASE-T2: 100 Mbit/s Ethernet over Two Pairs of Category-3 Cabling", IEEE 1997 (Year: 1997).*

Diarra et al., "Improved Clock Synchronization Start-Up Time for Ethernet AVB-Based In-Vehicle Networks," 2015 IEEE 20th Conference on Emerging Technologies & Factor Automation (ETFA), IEEE, Sep. 8, 2015 (8 pages).

International Search Report and Written Opinion for Application No. PCT/US2021/052100, dated Feb. 2, 2022 (15 pages).

IEEE Std 802.3ch-2020 "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207 (Jun. 30, 2020).

* cited by examiner

ROBUST LINK SYNCHRONIZATION IN ETHERNET NETWORKS

CROSS REFERENCES TO RELATED APPLICATIONS

This application claims the benefit of U.S. Provisional Patent Application No. 63/083,630, entitled "Enhancing Robustness of Link Synchronization in Automotive Ethernet," filed on Sep. 25, 2020, which is hereby incorporated herein by reference in its entirety.

FIELD OF TECHNOLOGY

The present disclosure relates generally to Ethernet communication systems, and more particularly to training synchronization between network devices in an Ethernet communication system operating in a noisy environment.

BACKGROUND

Modern vehicles, such as advanced automobiles, have begun using automotive Ethernet technologies to connect components over a wired physical network within the vehicle. One important requirement for an automotive Ethernet network is start-up time of the components of the Ethernet network. Typically, vehicle network components are required to be linked-up and operational within a certain period of time after start-up of the vehicle, for example within a hundred or several hundreds of milliseconds after start-up of the vehicle, to allow the vehicle to be fully operational within a certain time, such as within no more than two seconds, after start-up of the vehicle. A link-up process in a typical automotive application includes a synchronization stage followed by a training stage. During the synchronization stage, a device that is operating as a master device sequentially transmits one or more synchronization signals with transmission pauses separating respective transmissions of the synchronization signals. When a device operating as a slave device detects a synchronization signal transmitted by the master device, the slave device transmits a synchronization response signal to the master device. After the master device detects the synchronization response signal from the slave device, the master device stops transmission of its synchronization signals to the slave device. Once this exchange of synchronization signals between the master device and the slave device is completed, the master device initiates the training stage of the link up process by transmitting a training signal to the slave device.

In some situations, however, the master device may miss detection of the synchronization signal transmitted by the slave device, for example due to transient noise that may be temporarily present on the link between the master device and the slave device. In this case, the master device will continue transmission of the synchronization signals, for example until termination of a timer set at the master device. Because the slave device is in the training mode, the slave device will no longer transmit synchronization signals to the master device. The link-up between the master device and the slave device will thus fail and will be restarted, which in turn may lead to violation of the linkup timing requirement for the automotive network. The likelihood of link up failure due to a missed detection of the synchronization signal by the master device becomes greater as the physical length (e.g., cable length) of the link between the master device and the slave device increases; in other words, a longer Ethernet cable becomes more susceptible to noise that may be present in the automotive network which in turn can impact the ability to synchronize timing among link partners.

SUMMARY

In an embodiment, a method for training synchronization between a first network interface device and a second network interface device includes: receiving, at the second network interface device, a first synchronization signal transmitted by the first network interface device, the synchronization signal being for training synchronization between the second network interface device and the first network interface device; in response to receiving the first synchronization signal from the first network interface device, transmitting, with the second network interface device, one or more initial synchronization response signals to the first network interface device, the one or more initial synchronization response signals being from among a fixed number of synchronization response signals that the second network interface device is configured to transmit to the first network interface device; after transmission of the one or more initial synchronization response signals, receiving a second synchronization signal from the first network interface device; and after receiving the second synchronization signal, continuing transmission of synchronization response signals from the second network interface device to the first network interface device until the fixed number of synchronization response signals are transmitted from the second network interface device to the first network interface device.

In another embodiment, an apparatus comprises a second network interface device for coupling the apparatus with a first network interface device via a network link. The second network interface device comprises a physical layer (PHY) processor, implemented on one or more IC devices, configured to: receive a first synchronization signal transmitted by the first network interface device, the first synchronization signal being for training synchronization between the second network interface device and the first network interface device; in response to receiving the first synchronization signal from the first network interface device, transmit one or more initial synchronization response signals to the first network interface device, the one or more initial synchronization response signals being from among a fixed number of synchronization response signals that the second network interface device is configured to transmit to the first network interface device; after transmission of the one or more initial synchronization response signals, receive a second synchronization signal from the first network interface device; and after receiving the second synchronization signal, continue transmission of synchronization response signals to the first network interface device until the fixed number of synchronization response signals are transmitted from the second network interface device to the first network interface device.

DETAILED DESCRIPTION

In various embodiments described below, link establishment between a first network device (e.g., a master device) and a second network device (e.g., a slave device) in an Ethernet network includes transmission of multiple synchronization signals from the slave device to the master device. Transmission of multiple synchronization signals from the slave device to the master device increases the probability of detection, by the master device, of a synchronization signal from the slave device, for example in the presence of transient noise on a link between the master device and the slave device. For example, if the master device misses detection of one or more initial synchronization signal from the slave device due, for example, to transient noise on the link between the master device and the slave device, the master device will detect a subsequent one of the multiple synchronization signals transmitted by the slave device, in an embodiment. Transmission of multiple synchronization signals from the slave device to the master device thus reduces or eliminates a chance of a link up failure in a link establishment procedure performed between the master device and the slave device, in at least some embodiments.

In an embodiment, the slave device is configured to transmit a predetermined fixed number of synchronization signals to the master devices. In some scenarios, in an embodiment, after transmission of one or more initial synchronization signals from among the fixed predetermined number of synchronization signals, to the master device, the slave device receives a synchronization signal from the master device. Receiving the synchronization signal from the master device, after transmission of one or more initial synchronization signals to the master device, generally signifies that the master device missed detection of the one or more initial synchronization signals from the slave device, in an embodiment. In response to receiving the synchronization signal from the master device after transmission of the one or more initial synchronization signals to the master device, the slave device continues transmission of the multiple synchronization response signals to the master device until the predetermined fixed number of synchronization signals is transmitted from the slave device to the master device. In an embodiment, the slave device continues transmission of the predetermined fixed number of synchronization response signals to the master device without restarting transmission of the predetermined fixed number of synchronization signals to the master device. Continuing transmission of synchronization signals to the master device without restarting transmission of the predetermined fixed number of synchronization signals to the master device ensures that the transmission of the predetermined fixed number of synchronization response signals is not restarted due to a false detection of a synchronization signal from the master device, in an embodiment.

Figure 1:
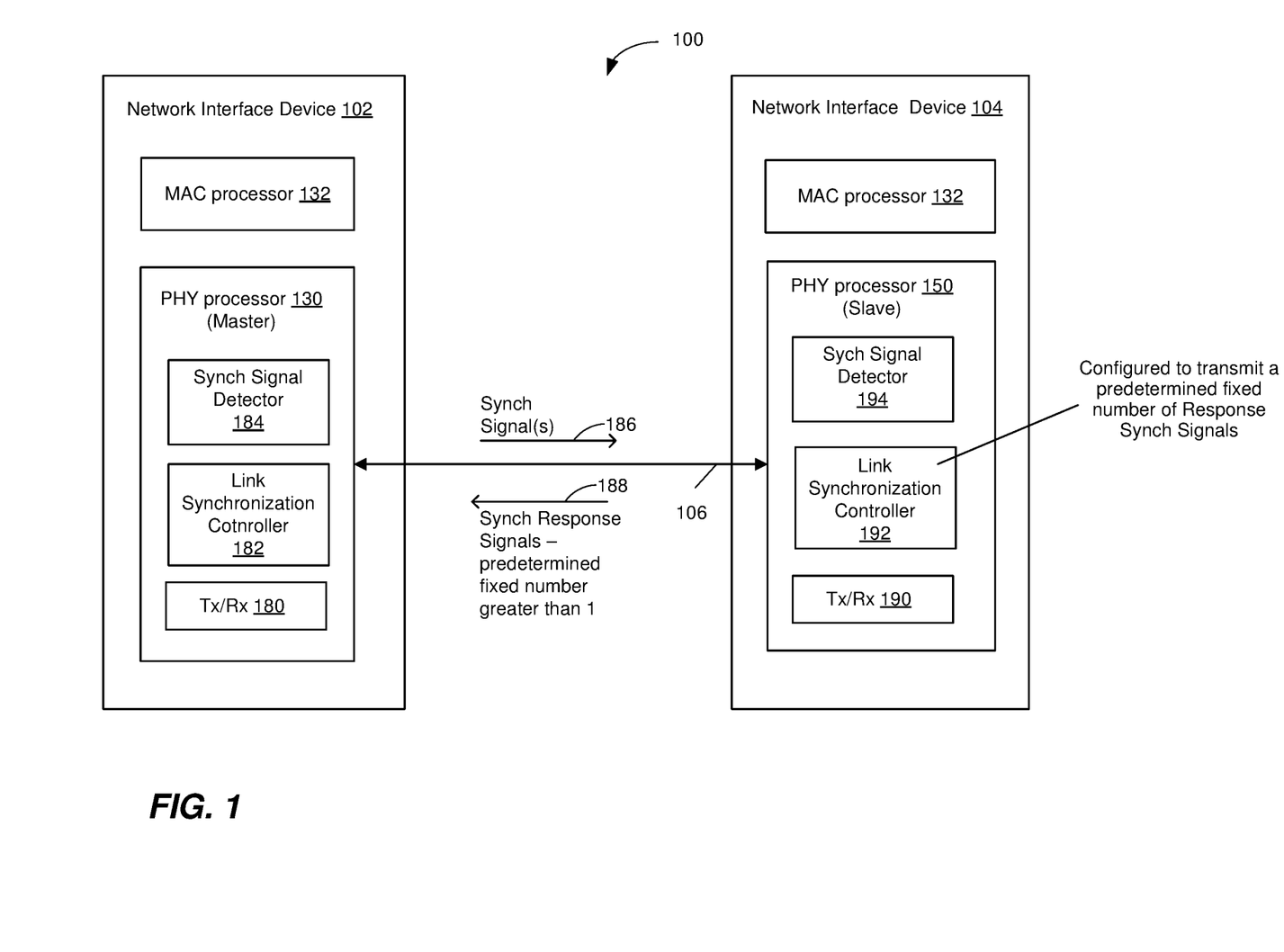
FIG. 1 is a block diagram of an example system in which a slave device is configured to transmit multiple synchronization response signals during a synchronization procedure establishment between a master device and a slave device, according to an embodiment.

FIG. 1 is a block diagram of an example system in which a slave device is configured to transmit multiple synchronization signals during a synchronization procedure in link establishment between a master device and the slave device, according to an embodiment. The system 100 includes a first network interface device 102 coupled to a second network interface device 104 via a network link 106. In an embodiment, the first network interface device 102 and the second network interface device 104 are generally configured to operate according to an automotive Ethernet standard, such as an IEEE 802.3 standard. In another embodiment, the first network interface device 102 and the second network interface device 104 are generally configured to operate according to one or more other suitable communication protocols.

The first network interface device 102 and the second network interface devices 104 are associated with electronic devices of an automotive network system, in an embodiment. As just an example, the first network interface device 102 is associated with an accessory device, such as a camera or a telematics radio device, in an automobile and the second network interface device 104 is associated with a central processing unit in the automobile, in an embodiment. In other embodiments, the first network interface device 102 and/or the second network interface device 104 are associated with other suitable electronic devices in an automobile, such as an infotainment device, a sensor device (e.g., a lidar device, a radar, an audio sensor, a video sensor, a proximity sensor, etc.), a control device, etc. in the automobile. The network link 106 between the network interface device 102 and the network interface device 104 comprises a single twisted pair copper link, in an embodiment. In another embodiment, the network link 106 is a suitable link different from a single twisted pair copper link. For example, the network link 106 is a multi-pair copper link, an optical link, a fiber link, a radio frequency plastic waveguide link, etc., in various embodiments. In some embodiments, the first network interface device 102 and the second network interface device 104 are utilized in networks other than an automotive network. For example, in some embodiments, the first network interface device 102 and the second network interface device 104 are utilized in an industrial or process industry network.

The network interface device 102 includes one or more physical layer (PHY) processors 130 (sometimes referred to herein as "the PHY processor 130" for brevity). The PHY processor 130 includes a transceiver 180 configured to transmit and receive signals over the link 106. The network interface device 102 also includes one or more media access control (MAC) processors 132 (sometimes referred to herein as "the MAC processor 132" for brevity) coupled to the PHY processor 130, in an embodiment. In another embodiment, the network interface device 102 omits the MAC processor 132. For example, the MAC processor 132 is external to the network interface device 102, in an embodiment. In various embodiments in which the MAC processor 132 is external to the network interface device 102, the MAC processor 132 may be co-located on a same printed circuit board (PCB) as the PHY processor 130, or may be located on a separated PCB from the PHY processor 130.

The PHY processor 130 includes one or more encoder devices (not shown), a scrambler device (not shown), and a modulator (not shown) for encoding, scrambling, and modulating data as part of generating a transmission signal, according to an embodiment. The PHY processor 130 also includes a demodulator (not shown), a de-scrambler device (not shown), and one or more decoder devices (not shown) for demodulating, de-scrambling, and decoding as part of generating the received data, according to an embodiment. In some embodiments, the PHY processing device 130 also includes an analog to digital converter (hereinafter "ADC", not shown) that converts an analog signal received via the communication medium to a digital signal. In some embodiments, the PHY processor 130 also includes a digital signal processor (hereinafter "DSP", not shown) that processes the digital signal to generate a signal corresponding to modulation symbols that are then demodulated by the demodulator (not shown).

The network interface device 102 is implemented using one or more integrated circuits (ICs) configured to operate as discussed below. For example, the PHY processor 130 may be implemented, at least partially, on a first IC, and the MAC processor 132 may be implemented, at least partially, on a second IC. As another example, at least a portion of the PHY processor 130 and at least a portion of the MAC processor 132 may be implemented on a single IC. For instance, the network interface device 102 may be implemented using a system on a chip (SoC), where the SoC includes at least a portion of the PHY processor 130 and at least a portion of the MAC processor 132. In an embodiment in which various IC components are implemented on different ICs, the ICs may be packaged together to form a single network interface device.

The network interface device 104 includes one or more physical layer (PHY) processors 150 (sometimes referred to herein as "the PHY processor 150" for brevity). The PHY processor 150 includes a transceiver 190 configured to transmit and receive signals over the link 106. The network interface device 104 also includes one or more media access control (MAC) processors 152 (sometimes referred to herein as "the MAC processor 152" for brevity) coupled to the PHY processor 150, in an embodiment. In another embodiment, the network interface device 104 omits the MAC processor 152. For example, the MAC processor 152 is external to the network interface device 104, in an embodiment. In various embodiments in which the MAC processor 152 is external to the network interface device 104, the MAC processor 152 may be co-located on a same printed circuit board (PCB) as the PHY processor 150, or may be located on a separated PCB from the PHY processor 150.

The PHY processor 150 includes one or more encoder devices (not shown), a scrambler device (not shown), and a modulator (not shown) for encoding, scrambling, and modulating data as part of generating a transmission signal, according to an embodiment. The PHY processor 150 also includes a demodulator (not shown), a de-scrambler device (not shown), and one or more decoder devices (not shown) for demodulating, de-scrambling, and decoding as part of generating the received data, according to an embodiment. In some embodiments, the PHY processor 150 also includes an analog to digital converter (hereinafter "ADC", not shown) that converts an analog signal received via the communication medium to a digital signal. In some embodiments, the PHY processor 150 also includes a digital signal processor (hereinafter "DSP", not shown) that processes the digital signal to generate a signal corresponding to modulation symbols that are then demodulated by the demodulator (not shown).

The network interface device 104 is implemented using one or more integrated circuits (ICs) configured to operate as discussed below. For example, the PHY processor 150 may be implemented, at least partially, on a first IC, and the MAC processor 152 may be implemented, at least partially, on a second IC. As another example, at least a portion of the PHY processor 150 and at least a portion of the MAC processor 152 may be implemented on a single IC. For instance, the network interface device 104 may be implemented using a system on a chip (SoC), where the SoC includes at least a portion of the PHY processor 150 and at least a portion of the MAC processor 152. In an embodiment in which various IC components are implemented on different ICs, the ICs may be packaged together to form a single network interface device.

In various embodiments, a PHY processor (e.g., the PHY processor 130, 150) in the system 100 can be configured either as a master PHY processor or a slave PHY processor. A master PHY processor uses a free running local clock to determine the timing of transmitter operations, in an embodiment. A slave PHY processor recovers the clock from the signal received from the master PHY processing device and uses the received signal to determine the timing of transmitter operations. Furthermore, the master PHY processor and the slave PHY processor are configured to synchronize their clocks and timing of transmitter operations during a synchronization phase before entering normal data transmission phase. In various embodiments, synchronization among sensors in an automotive network ensures that inputs from a plurality of various sensors distributed through a vehicle can be combined into an accurate comprehensive representation of events impacting the vehicle. As an example, the PHY processor 130 of the network interface device 102 (sometimes referred to herein as "master network interface device 102") is configured as a master PHY processor (sometimes referred to herein as "master PHY processor 130"), and the PHY processor 150 of the network interface device 104 (sometimes referred to herein as "slave network interface device 104") is configured as a slave PHY processor (sometimes referred to herein as "slave PHY processor 150"), in an embodiment.

The master PHY processor 130 includes a link synchronization controller 182 and a synchronization signal detector 184, in an embodiment. The link synchronization controller 182 is configured to generate one or more synchronization signals 186 to enable the slave PHY processor 150 to synchronize operations with the master PHY processor 130, in an embodiment. The transceiver 180 is configured to transmit the one or more synchronization 186 to the slave PHY processor 150 over the network link 106 during a synchronization phase of link establishment between the network interface device 102 and the network interface device 104, in an embodiment. The transceiver 180 is also configured to receive one or more synchronization signals from the slave PHY processor 150 over the network link 106 during the synchronization phase of link establishment between the network interface device 102 and the network interface device 104, in an embodiment. The synchronization signal detector 184 is configured to detect a synchronization signal received from the slave PHY processor 150, in an embodiment. For example, in an embodiment, the synchronization signal comprises a known periodic pseudorandom sequence. In an embodiment, the synchronization signal detector 184 is configured to perform correlation of a received signal with the known periodic pseudorandom sequence and determine that the received signal is a synchronization signal if the correlation result is above a detection threshold.

In an embodiment, the link synchronization controller 182 and/or the synchronization signal detector 184 is implemented by a processor configured to execute machine readable instructions stored in a memory device (not shown) such as a RAM, a ROM, a flash memory, etc. In an embodiment, the link synchronization controller 182 and/or the synchronization signal detector 184 additionally or alternatively includes a hardware state machine that is configured to generate and/or detect synchronization signals such as described herein.

The slave PHY processor 150 includes a link synchronization controller 192 and a synchronization signal detector 194, in an embodiment. The transceiver 190 of the slave PHY processor 150 is configured to receive a synchronization signals 184 transmitted by the master PHY processor 130 during the synchronization phase of link establishment between the network interface device 102 and the network interface device 104. The synchronization signal detector 194 is configured to detect a synchronization signal received from the master PHY processor 130, in an embodiment. For example, in an embodiment, the synchronization signal comprises a known periodic pseudorandom sequence. In an embodiment, the synchronization signal detector 194 is configured to perform correlation of a received signal with the known periodic pseudorandom sequence and determine that the received signal is a synchronization signal if the correlation result is above a detection threshold.

In response to detection of the synchronization signal by the synchronization signal detector 184, the link synchronization controller 192 is configured to transmit multiple synchronization signals 188 (sometimes referred to herein as "synchronization response signals") to the master PHY processor 130. For example, the link synchronization controller 192 is configured to transmit a fixed number of multiple synchronization response signals 188 to the master PHY processor 130. In an embodiment, the fixed number synchronization response signals 188 that the link synchronization controller 192 is configured to transmit is configurable and/or programmable in the slave PHY processor 150. Transmission of multiple synchronization response signals 188 from the slave PHY processor 150 to the master PHY processor 130 increases the probability of detection of a synchronization signal 188 at the master PHY processor 130, for example in the presence of transient noise on the network link 106 between the master PHY processor 130 and the slave PHY processor 150, in at least some embodiments.

In an embodiment, the link synchronization controller 192 and/or the synchronization signal detector 194 is implemented by a processor configured to execute machine readable instructions stored in a memory device (not shown) such as a RAM, a ROM, a flash memory, etc. In an embodiment, the link synchronization controller 192 and/or the synchronization signal detector 194 additionally or alternatively includes a hardware state machine that is configured to generate and/or detect synchronization signals such as described herein.

Figure 2:
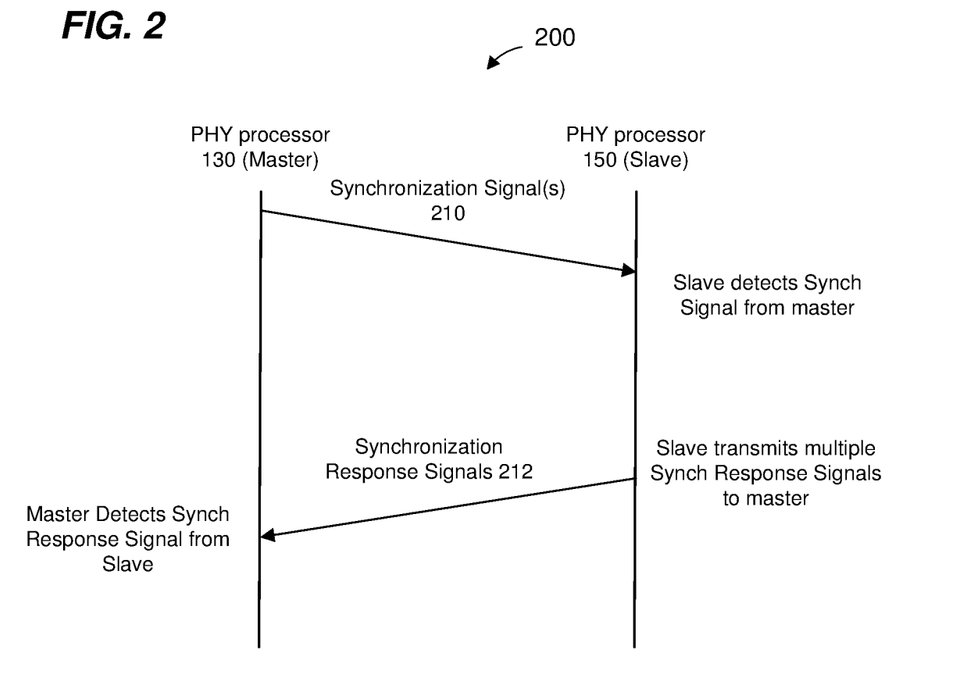
FIG. 2 is an example timing diagram of a synchronization signal exchange sequence performed during a synchronization phase of link establishment between the master device and the slave device of FIG. 1, according to an embodiment.

FIG. 2 is an example timing diagram of a synchronization signal exchange sequence 200, according to an embodiment. The synchronization signal exchange sequence 200 is performed during a synchronization phase of a link establishment process for establishing a communication link between the network interface device 102 and second network interface device 104 of the system 100 of FIG. 1, according to an embodiment. For ease of explanation, the synchronization signal exchange sequence 200 is described in the context of the system 100 of FIG. 1. In other embodiments, the synchronization signal exchange sequence 200 is utilized in a process of establishing a communication link in systems different from the system 100 of FIG. 1.

The master PHY processor 130 of the network interface device 102 initiates the synchronization signal exchange sequence by transmitting one or more synchronization signals 210 to the slave PHY processor 150 of the network interface device 104 over the link 106. The one or more synchronization signals 210 correspond to the one or more one or more synchronization signals 186 of FIG. 1, in an embodiment. The one or more synchronization signals 210 are generally used to synchronize operations of the slave PHY processor 150 with the master PHY processor 130, in an embodiment. In an embodiment, each respective synchronization signal 210 comprises a pseudorandom sequence transmitted by the maser PHY processor 130. In another embodiment, each respective synchronization signal 210 comprises a suitable synchronization signal different from a pseudorandom sequence. The master PHY processor 130 is configured to transmit the one or more synchronization signals 210 until the master PHY processor 130 receives and detects a synchronization response signal from the slave PHY processor 150, in an embodiment. The master PHY processor 130 is configured to, in response to detecting a synchronization response signal from the slave PHY processor 150, stop transmission of the synchronization signals 210 and transition into a state for a next phase (e.g., a training phase) of the link establishment process, such as a check link state for a link check phase of the link establishment process, in an embodiment.

In an embodiment, the slave PHY processor 150 is in a signal detection wait mode until the slave PHY processor 150 detects a synchronization signal 210 from the master PHY processor 130. In response to detecting a synchronization signal 210 from the master PHY processor 130, the slave PHY processor 150 initiates transmissions of synchronization signals 212 to the master PHY processor 130, in an embodiment. In an embodiment, each respective synchronization response signal 212 comprises a pseudorandom sequence transmitted by the slave PHY processor 150. In another embodiment, each respective synchronization response signal 212 comprises a suitable synchronization signal different from a pseudorandom sequence. In an embodiment, the slave PHY processor 150 transmits multiple synchronization response signals 212 to the master PHY processor 130. For example, the slave PHY processor 150 is configured to transmit a fixed (e.g., configurable and/or programmable) number of synchronization response signals 212 to the master PHY processor 130. In an embodiment, transmission of multiple synchronization signals 212 from the slave PHY processor 150 to the master PHY processor 130 increases probability of detection of one of the synchronization response signals 212 transmitted by the slave PHY processor 150, for example in the presence of noise on the link 106. For example, if initial one or more synchronization response signals 212 are not detected by the master PHY processor 130 due, for example, to noise in the link 106, the master PHY processor 130 may detect a subsequent one of the multiple synchronization response signals 212 once noise subsides on the link 106. Moreover, because upon detection of the synchronization response signal 212 the master PHY processor 130 enters a next phase of the link establishment procedure, and is not expecting reception of a synchronization response signal from the slave PHY processor 150, transmission of additional synchronization response signals 212 does not negatively affect operation of the master PHY processor 130 or delay completion of link establishment, in at least some embodiments. Upon completion of transmission of the multiple synchronization response signals 212 to the master PHY processor 130, the slave PHY processor 150 transitions to a next phase of link establishment, such as a training phase of link establishment. The master PHY processor 130 and the slave PHY processor 150 are then synchronized and ready to begin the next phase of link establishment, such as the training phase of link establishment, in an embodiment.

Figure 3:
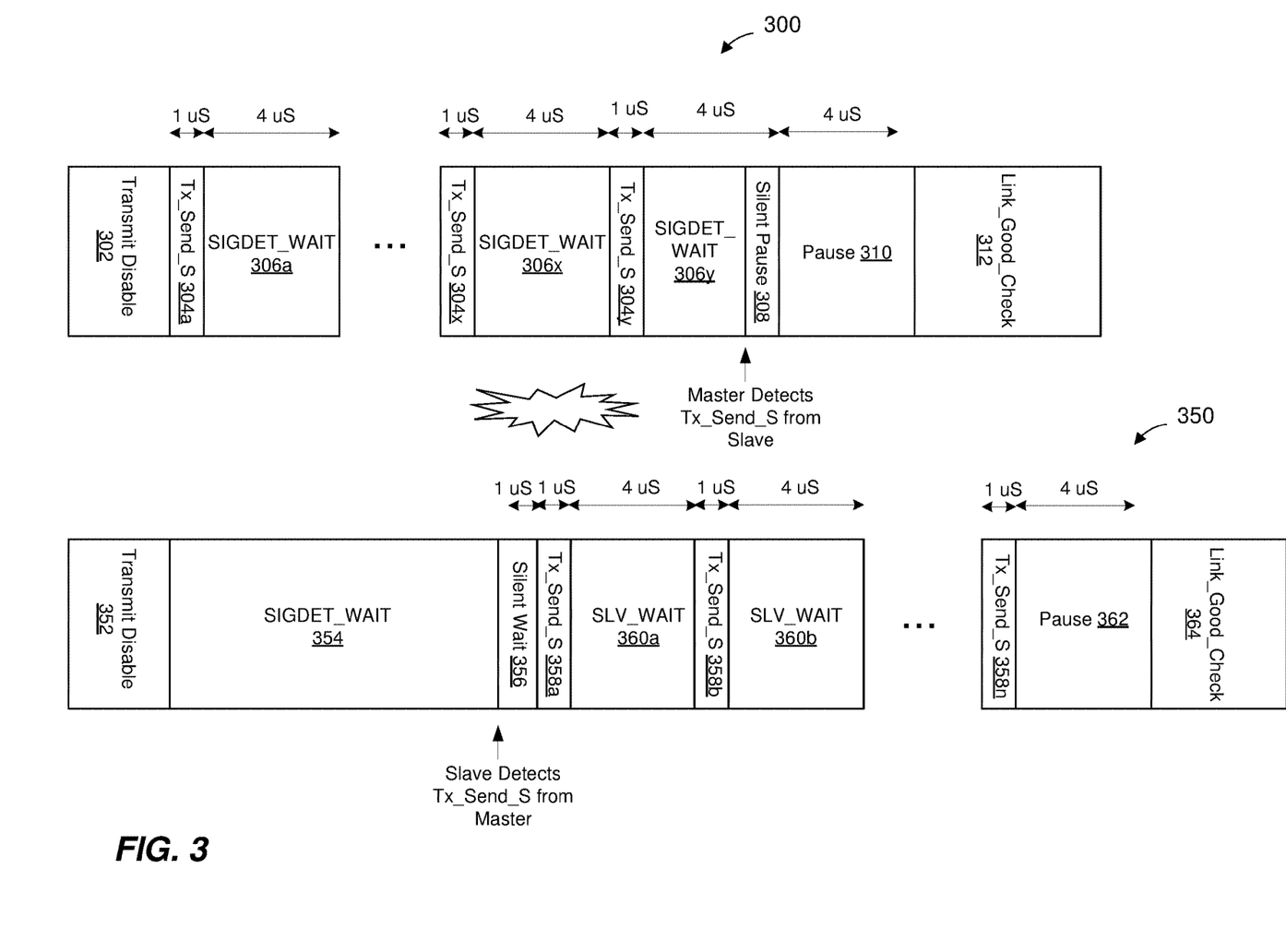
FIG. 3 is a diagram of synchronization sequences performed during a synchronization phase of a link establishment process between the master device and the slave device of the system of FIG. 1, according to an embodiment.

FIG. 3 is a diagram of synchronization sequences 300, 350 performed during a synchronization phase of a link establishment process, according to an embodiment. The synchronization signal transmission sequence 300 is implemented by the master PHY processor 130 of FIG. 1, in an embodiment. The synchronization signal transmission sequence 350 is implemented by the slave PHY processor 150 of FIG. 1, in an embodiment. In other embodiments, the synchronization sequences 300, 350 are implemented by devices different from the master PHY processor 130 and the slave PHY processor 150 of FIG. 1.

The synchronization sequence 300 begins with the master PHY processor 130 being in a transmit disable state 302. The master PHY processor 130 initiates the transmit disable state 302 upon power-up, for example. The master PHY processor 130 then begins transmission of one or more synchronization signals, such as one or more Tx_Send_S signals 304. After transmission of each of the one or more Tx_Send_S signals 304, the master PHY processor 130 transitions into a signal detect wait (SIGDET_WAIT) state 306 and remains in the signal detect wait state 306 for a duration of a pause time corresponding to a signal detect wait time period. In an embodiment, the signal detect wait time period is a maximum of 4 μs as defined by the IEEE 803.3ch standard. In another embodiment, the signal detect wait time period is of a suitable maximum durations different from 4 μs. In an embodiment, if during the signal detect wait time period the master PHY processor 130 detects a synchronization signal from the slave PHY processor 150, then the he master PHY processor 130 transitions to a pause state 310 to complete the synchronization procedure, in an embodiment. The master PHY processor 130 then enters a link check state 312 to perform a link check as part of link establishment between the network interface device 102 and the network interface device 104, in an embodiment. On the other hand, if during the signal detect wait time period the master PHY processor 130 does not detect a synchronization signal from the slave PHY processor 150, then the master PHY processor transmits another synchronization signal 304 to the slave PHY processor 130, in an embodiment.

With continued reference to FIG. 3, similar to the state transition and synchronization signal transmission sequences 300 implemented by the master PHY processor 130, the state transition and synchronization signal transmission sequence 350 implemented by the slave PHY processor 150 begins with the slave PHY processor 150 being in a transmit disable state 352. Immediately following the transmit disable state 322, the slave PHY processor 150 enters a signal detect wait state 354. The slave PHY processor 150 remains in the signal detect wait state 352 until the slave PHY processor 150 receives and detects a synchronization signal 304 from the master PHY processor 130, in an embodiment. In response to receiving and detecting a synchronization signal 304 from the master PHY processor 130, the slave PHY processor 150 transitions into a silent wait state 356 and remains in the silent wait state 356 for a duration of a silent wait time period, in an embodiment. In an embodiment, the duration of the silent wait time period is 1 us. In another embodiment, the silent wait time period is of a suitable duration different from 1 us.

In an embodiment, upon completion of the silent wait period, the slave PHY processor 150 initiates transmission of a fixed number of synchronization response signals 358 to the master PHY processor 130. The synchronization signals 358 correspond to the synchronization signals 212 of FIG. 2, in an embodiment. In another embodiment, the synchronization signals 358 are different from the synchronization signals 212 of FIG. 2. In embodiment, the slave PHY processor 150 enters a slave wait state 360 between transmission of consecutive synchronization signals 358. In the slave wait state 360, no transmission is performed by the slave PHY processor 150, in an embodiment. In an embodiment, the slave PHY processor 150 remains in the slave wait state 360 for a duration of a pause time corresponding to a slave wait time period. In an embodiment, the duration of the slave wait time period is 4 μs. In another embodiment, the slave wait time period is of a suitable duration different from 4 μs. In an embodiment, transmission of the fixed number of synchronization signals 358 to the master PHY processor 130 increases the probability of detection of a synchronization signal 358 by the master PHY processor 130, even in the presence of noise on the link 106. For example, as illustrated in FIG. 3, if the master PHY processor 130 misses detection of one or more initial synchronization signal 358 due, for example, to transient noise on the link 106, the master PHY processor 130 will detect a subsequent synchronization signal 358, in an embodiment.

Figure 4:
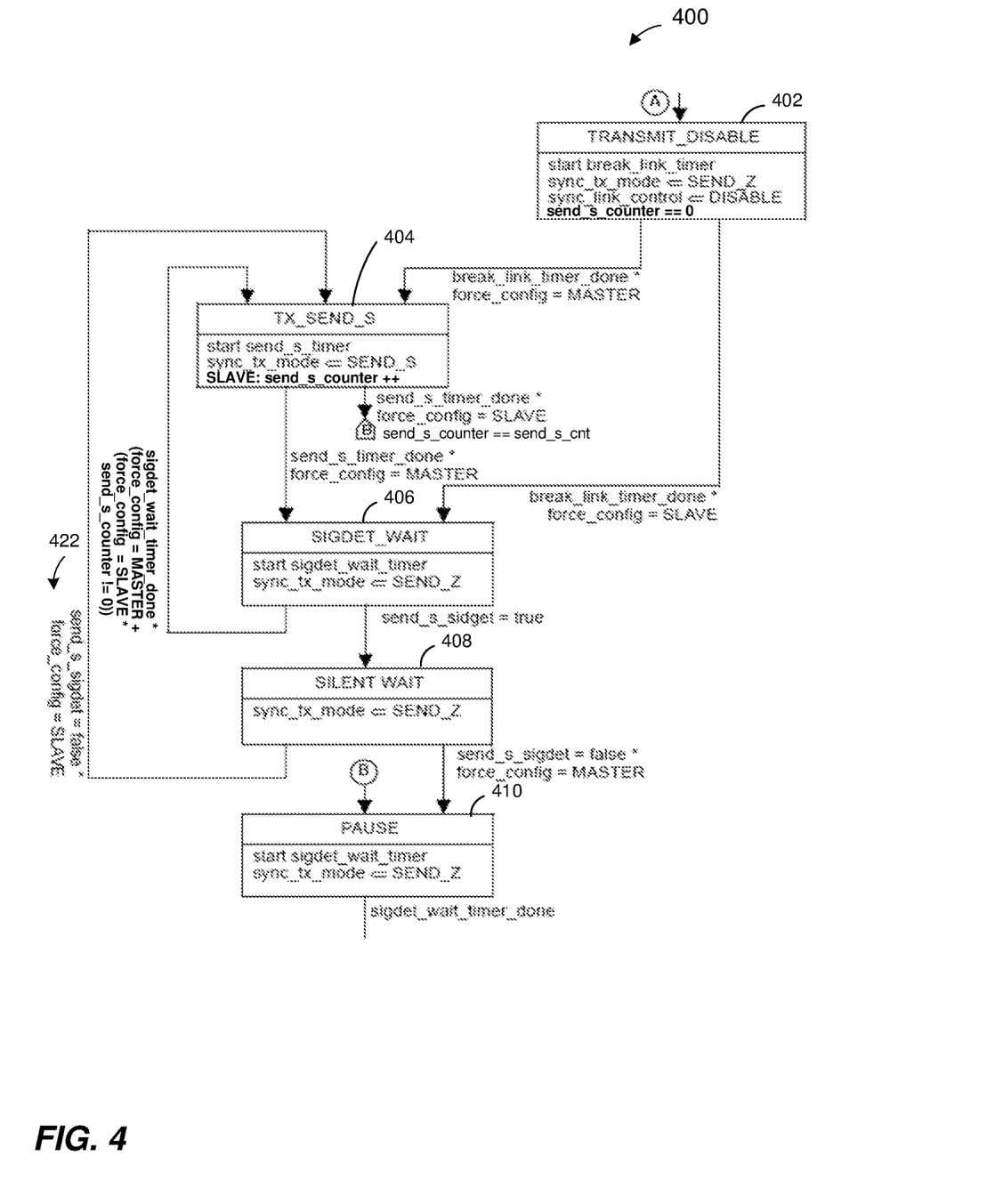
FIG. 4 is a state diagram illustrating example states and state transitions during a synchronization procedure between the master device and the slave device of FIG. 1, according to an embodiment.

FIG. 4 is a state diagram 400 illustrating example states and state transitions for operation during a synchronization procedure performed by a PHY processor, according to an embodiment. In an embodiment, the PHY processors 130, 150 of FIG. 1 are configured to function according to the state diagram 400, and FIG. 4 is generally described with reference to FIG. 1 for ease of explanation. In other embodiments, the PHY processors 130, 150 of FIG. 1 are configured to function according to another suitable state diagram. Additionally, in other embodiments, a suitable PHY processing device other than the PHY processing devices 130, 150 is configured to function according to the state diagram 400.

Initially, the PHY processor operates in a transmit disable state 402, in an embodiment. The PHY processor enters the transmit disable state 402 upon power-up or upon initiation of a link establishment procedure, in an embodiment. While in the transmit disable state 402, the PHY processor enables various modes and initiates various timers for signal synchronization, in the embodiment. For example, the PHY processor starts a break link timer and sets a transmit mode to a send all zeros (Send_Z) mode so that no transmission is performed, in an embodiment. The PHY processor also disables a synchronization link control mode and initiates a send synchronization signal counter (send_s_counter), in an embodiment. Transition from the transmit disable state 402 to a next state depends on whether the PHY processor is a master PHY processor (e.g., the master PHY processor 130) or a slave PHY processor (e.g., the slave PHY processor 150), in an embodiment. In a scenario in which the PHY processor is a master PHY processor (e.g., the master PHY processor 130), the master PHY processor 130 transitions from the transmit disable state 402 to a transmit synchronization signal (Tx_Send_S) state 404. In the transmit synchronization signal state 404, the master PHY processor 130 starts a send signal (send_s) timer and sets the transmit mode to send synchronization signal (Send_S) for synchronization signal transmission, in an embodiment. The master PHY processor 130 thus transmits the synchronization signal until expiration of the send signal timer, in an embodiment. Upon expiration of the synchronization signal send timer, the master PHY processor 130 transitions to a signal detection wait state 406. In the signal detection wait state 406, the master PHY processor 130 starts a signal detection wait timer and sets the transmit mode to the send all zeros (Send_Z) state so that no transmission is performed by the master PHY processor 130, in an embodiment.

With continued reference to the signal detection wait state 406, if, while the master PHY processor 130 is in the signal detection wait state 406, the master PHY processor 130 detects a synchronization response signal from the slave PHY processor 150, then the master PHY processor 130 transitions to a silent wait state 408 followed by a pause state 410, in an embodiment. On the other hand, if, while in the signal detection wait state 406, the master PHY processor 130 does not detect a synchronization response signal from the slave PHY processor 150, then the master PHY processor 130 loops back to the synchronization transmission state 404 and transmits another synchronization signal to the slave PHY processor 150. The master PHY processor 130 continues transitioning between the synchronization signal transmission state 404 and the signal detect wait state 406 until the master PHY processor 130 detects a synchronization response signal from the slave PHY processor 150 during the signal detect wait state 406, in an embodiment.

Referring back to the transmit disable state 402, in a scenario in which the PHY processor is a slave PHY processor (e.g., the slave PHY processor 150), the slave PHY processor 150 transitions from the transmit disable state 402 to the signal wait state 406, in an embodiment. The slave PHY processor 150 remains in the signal detect wait state 406 until the slave PHY processor 150 detects a synchronization signal from the master PHY processor 130, in an embodiment. In response to detecting a synchronization signal from the PHY processor 130, the slave PHY processor 150 transitions to the silent state 410. From the silent state 410, the slave PHY processor 150 transitions to the transmit synchronization signal state 404, in an embodiment. In an embodiment, the transmit synchronization state 410 is generally the same for the slave PHY processor 150 as for the master PHY processor 130, except that the slave PHY processor 150 additionally increments the send synchronization signal counter, in an embodiment. The slave PHY processor 150 loops between the transmit synchronization state 410 and the signal detect wait state 406 until the send synchronization signal counter reaches a predetermined fixed number, in an embodiment. The slave PHY processor 150 thus transmits the predetermined fixed number of synchronization response signals, separated by the signal detect time periods, to the master PHY processor 130, in an embodiment. In some scenarios, the slave PHY processor 150 receives an additional synchronization signal from the master PHY processor 130 during a signal detect period after transmission of one or more initial synchronization signals to the master PHY processor 130. Receiving the additional synchronization signal from the master PHY processor 130 during a signal detect period after transmission of one or more initial synchronization signals to the master PHY processor 130 generally signifies that the master PHY processor 130 missed detection of the one or more initial synchronization signals from the slave PHY processor 150, in an embodiment. In response to receiving the additional synchronization signal from the master PHY processor 130, the slave PHY processor 130 continues transmission of the predetermined fixed number of synchronization response signals to the master PHY processor 130, in an embodiment. In an embodiment, the slave PHY processor 130 continues transmission of the predetermined fixed number of synchronization response signals to the master PHY processor 130 without restarting transmission of the predetermined fixed number of synchronization response signals to the master PHY processor 130. For example, the slave PHY processor 150 continues transmission of the predetermined fixed number of synchronization response signals without resetting the send synchronization signal counter, in an embodiment. Continuing transmission of synchronization response signals to the master PHY processor 130 without restarting transmission of the predetermined fixed number of synchronization response signals to the master PHY processor 130 ensures that the transmission of the predetermined fixed number of synchronization response signals is not restarted due to a false detection of an additional synchronization signal from the master PHY processor 130 during a signal detect period after transmission of one or more initial synchronization signals to the master PHY processor 130, in an embodiment.

With continued reference to FIG. 4, upon completion of transmission of the predetermined fixed number of synchronization response signals to the master PHY processor 130, the slave PHY processor 150 transitions to the pause state 410, in an embodiment. The pause state 410 completes the synchronization phase for the slave PHY processor 150, in an embodiment. Upon expiration of the signal detect wait timer in the pause state 410, the slave PHY processor 150 transitions to a link good state, in an embodiment.

Figure 5:
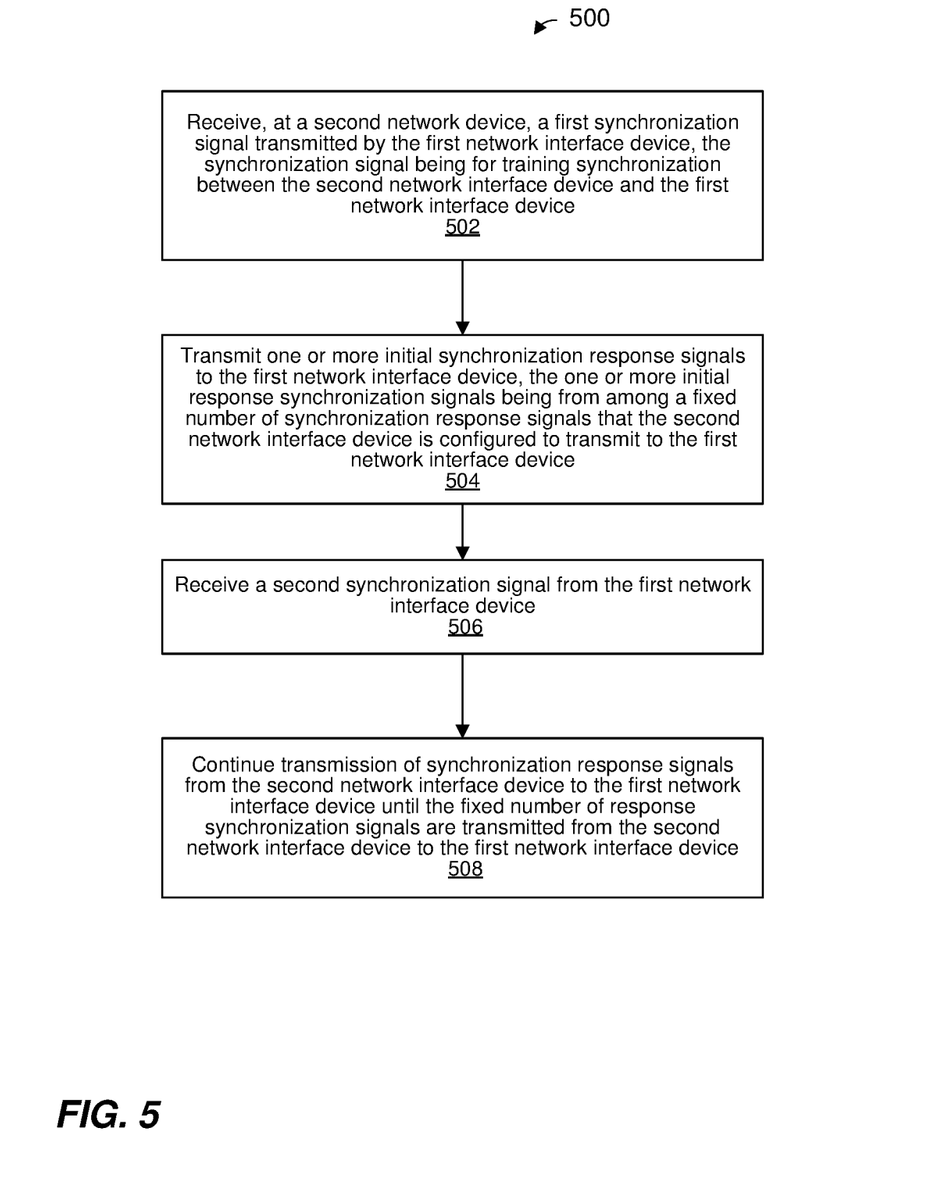
FIG. 5 is a flow diagram of an example method for training synchronization between the master device and the slave device of FIG. 1, according to an embodiment.

FIG. 5 is a flow diagram of an example method 500 for training synchronizing between a first network interface device and a second network interface device, according to an embodiment. The method 500 is implemented by a slave device, such as the slave PHY processor 150 of FIG. 1, in an embodiment. For ease of explanation, the method 500 is described herein in the context of the first network interface device being a master device (sometimes referred to herein as a "master network interface device") and the second network interface device being a slave device (sometimes referred to herein as a "master network interface device").

At block 502, the slave network interface device receives (e.g., the slave network interface device 104 receives, the slave PHY processor 150 receives, etc.) a first synchronization signal transmitted by the master network interface device. In an embodiment, the synchronization signal is for training synchronization between the slave network interface device and the master network interface device. In an embodiment, the slave network interface device receives a synchronization signal 210 of FIG. 2 or a synchronization signal 304 of FIG. 3. In another embodiment, the slave network interface device receives a synchronization signal different from the synchronization signal 210 of FIG. 2 or the synchronization signal 304 of FIG. 3.

At block 504, in response to receiving the first synchronization signal from the master network interface device, the slave network interface device transmits one or more initial synchronization response signals to the master network interface device. In an embodiment, the initial one or more synchronization response signals transmitted by the slave network interface device are initial synchronization response signals from among a fixed number of synchronization response signals that the slave network interface device is configured to transmit to the master network interface device. In an embodiment, the slave network interface device transmits one or more synchronization response signals 212 of FIG. 2 or synchronization response signals 358 of FIG. 3. In another embodiment, the slave network interface device transmits one or more synchronization response signals different from the synchronization signals 212 of FIG. 2 or synchronization response signals 358 of FIG. 3.

At block 506, after transmission of the one or more initial synchronization response signals to the master network interface device, the slave network interface device receives a second synchronization signal from the master network interface device. Reception of the second synchronization signal from the master network interface device at block 506, after transmission of one or more initial synchronization signals to the mater network interface device at block 504, generally signifies that the master network interface device missed detection of the one or more initial synchronization response signals transmitted at block 504 by the slave network interface device, in an embodiment.

At block 508, after receiving the second synchronization signal from the master network interface device, the slave network interface device continues transmission of synchronization response signals from the slave network interface device to the master network interface device until the fixed number of synchronization response signals are transmitted from the slave network interface device to the master network interface device. In an embodiment, the slave network interface device continues transmission of the predetermined fixed number of synchronization signals to the master network interface device without restarting transmission of the predetermined fixed number of synchronization signals to the master network interface device. Continuing transmission of synchronization signals to the master network interface device without restarting transmission of the predetermined fixed number of synchronization signals to the master network interface device ensures that the transmission of the predetermined fixed number of synchronization signals is not restarted due to a false detection of a synchronization signal from the master network interface device after transmission of one or more initial synchronization signals to the master network interface device, in an embodiment.

In an embodiment, a method for training synchronization between a first network interface device and a second network interface device includes: receiving, at the second network interface device, a first synchronization signal transmitted by the first network interface device, the synchronization signal being for training synchronization between the second network interface device and the first network interface device; in response to receiving the first synchronization signal from the first network interface device, transmitting, with the second network interface device, one or more initial synchronization response signals to the first network interface device, the one or more initial synchronization response signals being from among a fixed number of synchronization response signals that the second network interface device is configured to transmit to the first network interface device; after transmission of the one or more initial synchronization response signals, receiving a second synchronization signal from the first network interface device; and after receiving the second synchronization signal, continuing transmission of synchronization response signals from the second network interface device to the first network interface device until the fixed number of synchronization response signals are transmitted from the second network interface device to the first network interface device.

In other embodiments, the method also includes one of, or any suitable combination of two or more of, the following features.

The method further comprises initializing a send synchronization signal counter at the second network interface device, and incrementing the send synchronization signal counter for transmission of respective synchronization response signals to the first network interface device.

Continuing transmission of synchronization response signals from the second network interface device to the first network interface device comprises continuing transmission of the synchronization response signals until the send synchronization signal counter reaches the fixed predetermined number.

Continuing transmission of synchronization response signals from the second network interface device to the first network interface device comprises continuing transmission of the synchronization response signals without resetting the send synchronization signal counter in response to receiving the second synchronization signal from the first network interface device.

Continuing transmission of synchronization response signals from the second network interface device to the first network interface device comprises continuing transmission of the synchronization response signals in a time period during which the first network interface device is not expecting reception of a synchronization response signal from the second network interface device.

Transmitting one or more initial synchronization response signals by the second network device includes pausing transmission after respective ones of initial synchronization response signals, among the one or more initial synchronization response signals, for a duration of a pause time.

Receiving the second synchronization signal from the first network interface device comprises receiving the second synchronization signal during the pause time after transmission of an initial synchronization response signal among the one or more initial synchronization response signals transmitted by the second network interface device.

Pausing transmission after respective ones of initial synchronization response signals, among the one or more initial synchronization response signals, for a duration of a pause time comprises pausing transmission for 4 μs.

The method further comprises, after transmitting the fixed number of synchronization response signals from the second network interface device to the first network interface device, transitioning to a link check state at the network second network interface device.

Transmitting the one or more initial synchronization response signals comprises transmitting the one or more initial synchronization response signals from among a programmable fixed number of synchronization response signals that the second network interface device is configured to transmit to the first network interface device.

Transmitting a particular initial synchronization response signal, among the fixed number of synchronization response signals, to the first network interface device comprises transmitting a periodic pseudorandom sequence to the first network interface device.

In another embodiment, an apparatus comprises a second network interface device for coupling the apparatus with a first network interface device via a network link. The second network interface device comprises a physical layer (PHY) processor, implemented on one or more IC devices, configured to: receive a first synchronization signal transmitted by the first network interface device, the first synchronization signal being for training synchronization between the second network interface device and the first network interface device; in response to receiving the first synchronization signal from the first network interface device, transmit one or more initial synchronization response signals to the first network interface device, the one or more initial synchronization response signals being from among a fixed number of synchronization response signals that the second network interface device is configured to transmit to the first network interface device; after transmission of the one or more initial synchronization response signals, receive a second synchronization signal from the first network interface device; and after receiving the second synchronization signal, continue transmission of synchronization response signals to the first network interface device until the fixed number of synchronization response signals are transmitted from the second network interface device to the first network interface device.

In other embodiments, the apparatus also comprises one of, or any suitable combination of two or more of, the following features.

The PHY processor is further configured to initialize a send synchronization signal counter, increment the send synchronization signal counter for transmission of respective synchronization response signals to the first network interface device, and continue transmission of synchronization response signals to the first network interface device until the send synchronization signal counter reaches the fixed predetermined number.

The PHY processor is configured to continue transmission of the synchronization response signals to the first network interface device without resetting the send synchronization signal counter in response to receiving the second synchronization signal from the first network interface device.

The PHY processor is configured to continue transmission of the synchronization response signals to the first network interface device in a time period during which the first network interface device is not expecting reception of a synchronization response signal from the second network interface device.

The PHY processor is configured to pause transmission after respective ones of initial synchronization response signals, among the one or more initial synchronization response signals, for a duration of a pause time.

The PHY processor is configured to receive the second synchronization signal from the first network interface device during the pause time after transmission of an initial synchronization response signal among the one or more initial synchronization response signals transmitted by the second network interface device.

The PHY processor is configured to pause transmission after respective ones of initial synchronization response signals, among the one or more initial synchronization response signals, for a duration of 4 µs.

The PHY processor is further configured to transition to a link check state after transmitting the fixed number of synchronization response signals from the second network interface device to the first network interface device.

The fixed number of synchronization response signals that the second network interface device is configured to transmit to the first network interface device is programmable.

The PHY processor is further configured to transmit a particular synchronization response signal, among the fixed number of synchronization response signals, to the first network interface device at least by transmitting a periodic pseudorandom sequence to the first network interface device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for training synchronization between a first network interface device and a second network interface device, the method comprising:
    receiving, at the second network interface device, a first synchronization signal transmitted by the first network interface device during a synchronization phase of a link establishment process between the first network interface device and the second network interface device, the first synchronization signal being for training synchronization between the second network interface device and the first network interface device;
    in response to receiving the first synchronization signal from the first network interface device, transmitting, with the second network interface device, one or more initial synchronization response signals to the first network interface device during the synchronization phase, the one or more initial synchronization response signals being from among a fixed number of synchronization response signals that the second network interface device is configured to transmit to the first network interface device;
    after transmission of the one or more initial synchronization response signals and prior to completing the synchronization phase, receiving a second synchronization signal from the first network interface device; and
    after receiving the second synchronization signal and prior to completing the synchronization phase, continuing transmission of the fixed number of synchronization response signals from the second network interface device to the first network interface device until the fixed number of synchronization response signals are transmitted from the second network interface device to the first network interface device.

2. The method of claim 1, further comprising
    initializing a send synchronization signal counter at the second network interface device, and
    incrementing the send synchronization signal counter for transmission of respective synchronization response signals to the first network interface device, wherein
    continuing transmission of synchronization response signals from the second network interface device to the first network interface device comprises continuing transmission of the synchronization response signals until the send synchronization signal counter reaches the fixed predetermined number.

3. The method of claim 2, wherein continuing transmission of synchronization response signals from the second network interface device to the first network interface device comprises continuing transmission of the synchronization response signals without resetting the send synchronization signal counter in response to receiving the second synchronization signal from the first network interface device.

4. The method of claim 1, wherein continuing transmission of synchronization response signals from the second network interface device to the first network interface device comprises continuing transmission of the synchronization response signals in a time period during which the first network interface device is not expecting reception of a synchronization response signal from the second network interface device.

5. The method of claim 1, wherein transmitting one or more initial synchronization response signals by the second network device includes pausing transmission after respective ones of initial synchronization response signals, among the one or more initial synchronization response signals, for a duration of a pause time.

6. The method of claim 5, wherein receiving the second synchronization signal from the first network interface device comprises receiving the second synchronization signal during the pause time after transmission of an initial synchronization response signal among the one or more initial synchronization response signals transmitted by the second network interface device.

7. The method of claim 5, wherein pausing transmission after respective ones of initial synchronization response signals, among the one or more initial synchronization response signals, for a duration of a pause time comprises pausing transmission for 4 µs.

8. The method of claim 1, further comprising, after transmitting the fixed number of synchronization response signals from the second network interface device to the first network interface device, transitioning to a link check state at the network second network interface device.

9. The method of claim 1, wherein the fixed number of synchronization response signals that the second network interface device is configured to transmit to the first network interface device is programmable.

10. The method of claim 1, wherein transmitting a particular initial synchronization response signal, among the fixed number of synchronization response signals, to the first network interface device comprises transmitting a periodic pseudorandom sequence to the first network interface device.

11. An apparatus, comprising:
a second network interface device for coupling the apparatus with a first network interface device via a network link, the second network interface device comprising a physical layer (PHY) processor, implemented on one or more integrated circuit (IC) devices, the PHY processor being configured to
receive a first synchronization signal transmitted by the first network interface device during a synchronization phase of a link establishment process between the first network interface device and the second network interface device, the first synchronization signal being for training synchronization between the second network interface device and the first network interface device,
in response to receiving the first synchronization signal from the first network interface device, transmit one or more initial synchronization response signals to the first network interface device during the synchronization phase, the one or more initial synchronization response signals being from among a fixed number of synchronization response signals that the second network interface device is configured to transmit to the first network interface device;

after transmission of the one or more initial synchronization response signals and prior to completing the synchronization phase, receive a second synchronization signal from the first network interface device, and
after receiving the second synchronization signal and prior to completing the synchronization phase, continue transmission of the fixed number of synchronization response signals to the first network interface device until the fixed number of synchronization response signals are transmitted from the second network interface device to the first network interface device.

12. The apparatus of claim 11, wherein the PHY processor is further configured to
initialize a send synchronization signal counter,
increment the send synchronization signal counter for transmission of respective synchronization response signals to the first network interface device, and
continue transmission of synchronization response signals to the first network interface device until the send synchronization signal counter reaches the fixed predetermined number.

13. The apparatus of claim 12, wherein the PHY processor is configured to continue transmission of the synchronization response signals to the first network interface device without resetting the send synchronization signal counter in response to receiving the second synchronization signal from the first network interface device.

14. The apparatus of claim 11, wherein the PHY processor is configured to continue transmission of the synchronization response signals to the first network interface device in a time period during which the first network interface device is not expecting reception of a synchronization response signal from the second network interface device.

15. The apparatus of claim 11, wherein the PHY processor is configured to pause transmission after respective ones of initial synchronization response signals, among the one or more initial synchronization response signals, for a duration of a pause time.

16. The apparatus of claim 15, wherein the PHY processor is configured to receive the second synchronization signal from the first network interface device during the pause time after transmission of an initial synchronization response signal among the one or more initial synchronization response signals transmitted by the second network interface device.

17. The apparatus of claim 15, wherein the PHY processor is configured to pause transmission after respective ones of initial synchronization response signals, among the one or more initial synchronization response signals, for a duration of 4 µs.

18. The apparatus of claim 11, wherein the PHY processor is further configured to transition to a link check state after transmitting the fixed number of synchronization response signals from the second network interface device to the first network interface device.

19. The apparatus of claim 11, wherein the fixed number of synchronization response signals that the second network interface device is configured to transmit to the first network interface device is programmable.

20. The apparatus of claim 11, wherein the PHY processor is further configured to transmit a particular synchronization response signal, among the fixed number of synchronization response signals, to the first network interface device at least by transmitting a periodic pseudorandom sequence to the first network interface device.

* * * * *